(12) United States Patent
Shirvanian

(10) Patent No.: US 7,695,237 B2
(45) Date of Patent: Apr. 13, 2010

(54) REFUSE COLLECTION VEHICLE AND LIFTING APPARATUS THEREFOR

(76) Inventor: Kosti Shirvanian, 23 Corporate Plz. #247, Newport Beach, CA (US) 92660

( * ) Notice: Subject to any disclaimer, the term of this patent is extended or adjusted under 35 U.S.C. 154(b) by 0 days.

(21) Appl. No.: 12/188,437

(22) Filed: Aug. 8, 2008

(65) Prior Publication Data

US 2009/0148262 A1 Jun. 11, 2009

Related U.S. Application Data

(63) Continuation of application No. PCT/US2007/003550, filed on Dec. 8, 2007.

(60) Provisional application No. 60/771,778, filed on Feb. 9, 2006.

(51) Int. Cl.
*B60P 1/28* (2006.01)

(52) U.S. Cl. .................. 414/494; 414/500; 414/513; 414/516

(58) Field of Classification Search .............. 414/478, 414/480, 494, 500, 513, 516
See application file for complete search history.

(56) References Cited

U.S. PATENT DOCUMENTS

| | | | | |
|---|---|---|---|---|
| 2,523,916 | A | * | 9/1950 | Paiement .................. 414/516 |
| 2,530,350 | A | * | 11/1950 | Ehlert ...................... 414/516 |
| 3,049,378 | A | * | 8/1962 | Nelson ...................... 298/14 |
| 3,077,278 | A | * | 2/1963 | Alexander ................ 414/494 |
| 3,127,041 | A | * | 3/1964 | Flynn et al ............... 414/477 |
| 3,252,563 | A | | 5/1966 | Juengel |
| 3,841,505 | A | | 10/1974 | Kent |
| 3,857,504 | A | * | 12/1974 | Bausenbach et al. ........ 414/500 |
| 3,964,626 | A | * | 6/1976 | Arregui ..................... 414/480 |
| 4,109,810 | A | * | 8/1978 | Jones ........................ 414/477 |
| 4,133,439 | A | * | 1/1979 | Goranson .................. 414/494 |
| 4,455,118 | A | * | 6/1984 | Scharf ....................... 414/494 |
| 4,529,349 | A | * | 7/1985 | Lutz .......................... 414/478 |
| 4,645,405 | A | * | 2/1987 | Cambiano ................. 414/494 |
| 4,802,811 | A | * | 2/1989 | Nijenhuis .................. 414/478 |
| 4,934,898 | A | | 6/1990 | Galbreath |
| 4,954,039 | A | * | 9/1990 | Johnston et al. ............ 414/500 |
| 5,088,875 | A | * | 2/1992 | Galbreath et al. ........... 414/478 |
| 5,785,486 | A | * | 7/1998 | McNeilus et al. ........... 414/513 |
| 6,354,787 | B1 | * | 3/2002 | O'Daniel ................... 414/494 |
| 7,192,239 | B2 | * | 3/2007 | Marmur et al. ............ 414/478 |

OTHER PUBLICATIONS

PCT/US2007/03550, Jul. 24, 2009, Kosti Shirvanian, Search Report/Written Opinion.

* cited by examiner

*Primary Examiner*—James Keenan
(74) *Attorney, Agent, or Firm*—John J. Connors; Connors & Associates

(57) ABSTRACT

A refuse collection vehicle has a lifting apparatus for lifting a refuse storage container onto and off the vehicle's flat bed body. The lifting apparatus employs a pulley apparatus including a plurality of pulleys and a pulley carrier that is moved reciprocally by a single fluid actuated cylinder. A pulley cable is connected to the pulleys in a predetermined manner to apply to the pulley carrier substantially equal forces so the carrier avoids twisting laterally as it moves reciprocally.

14 Claims, 7 Drawing Sheets

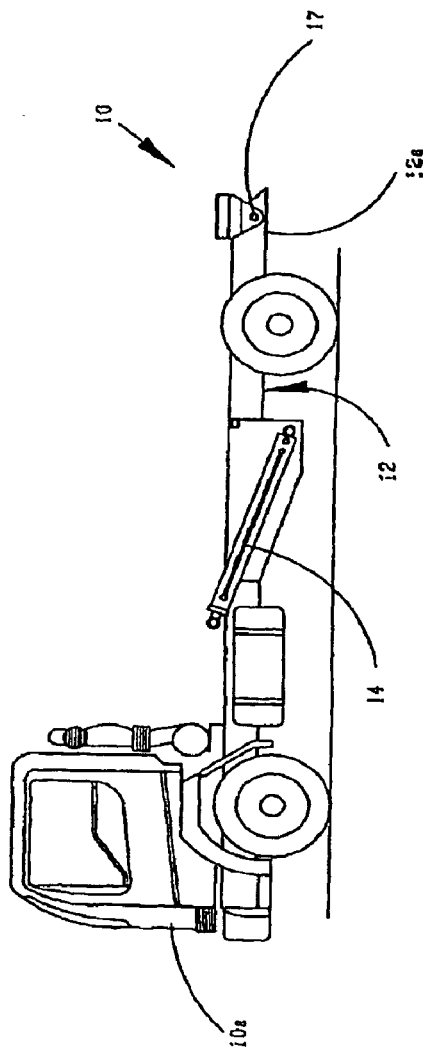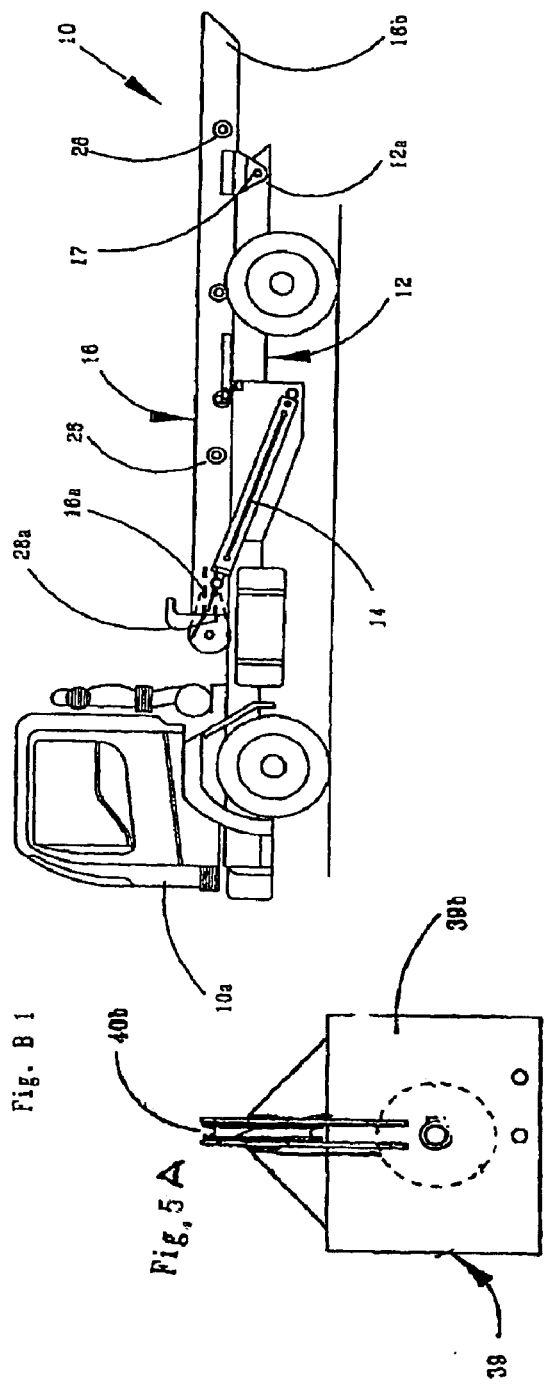

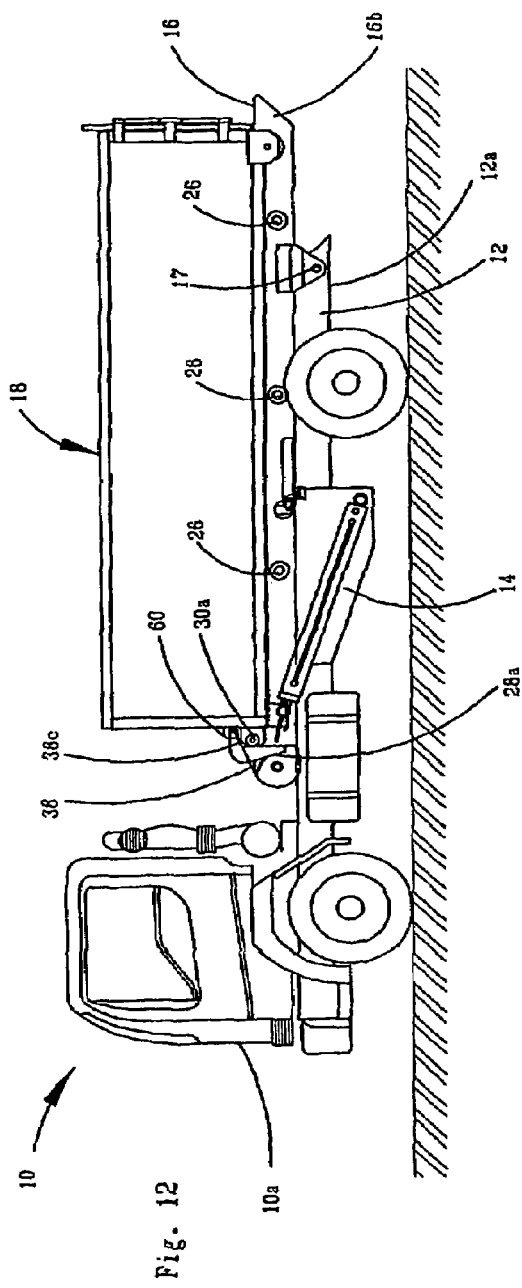
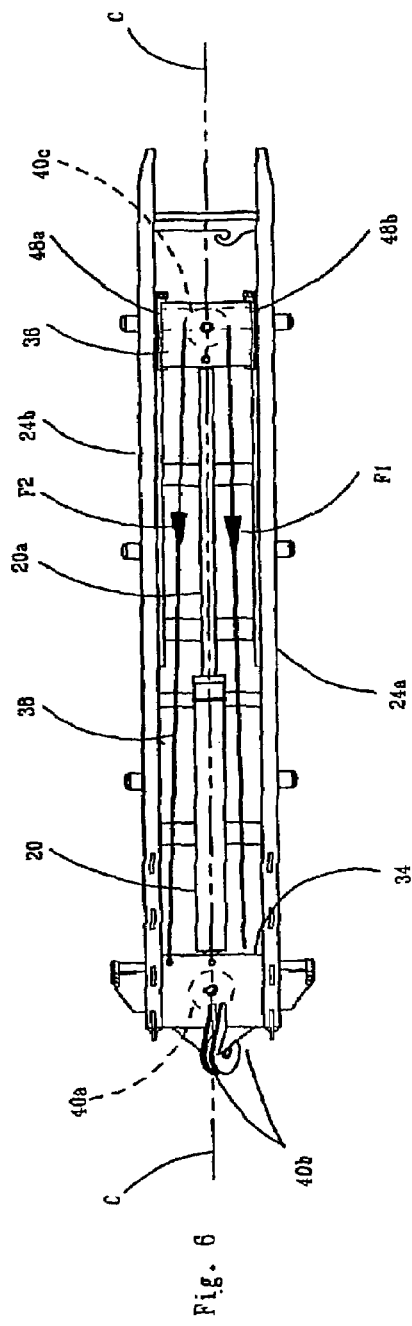
Fig. 12
Fig. 6

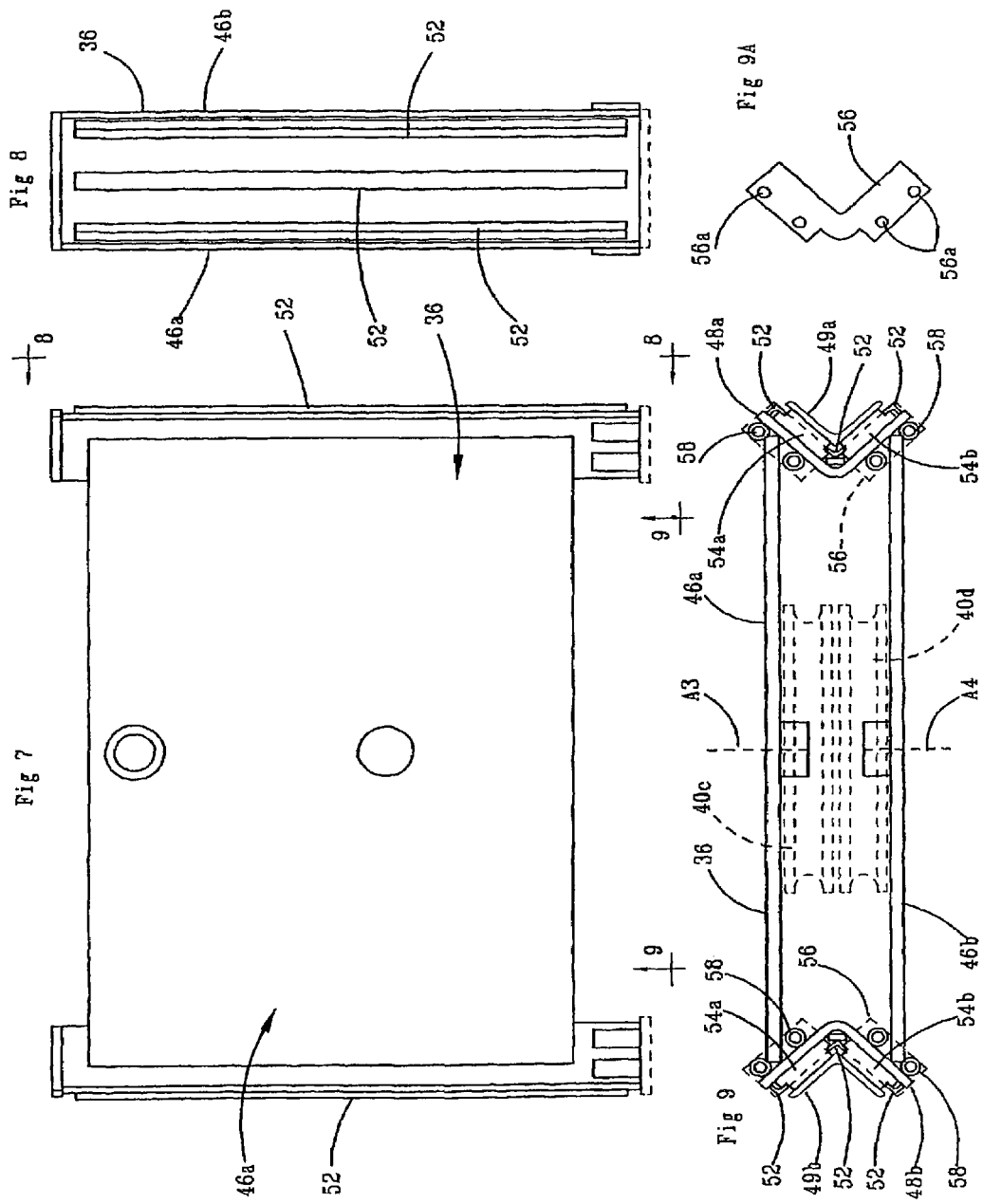

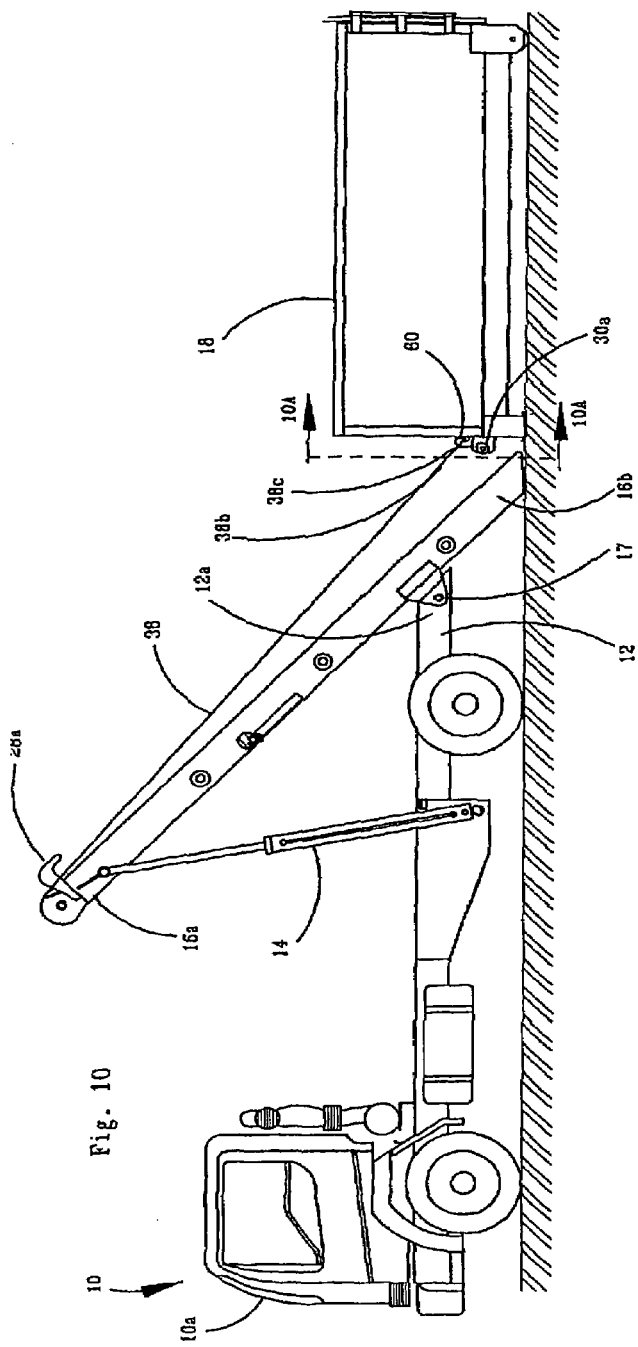
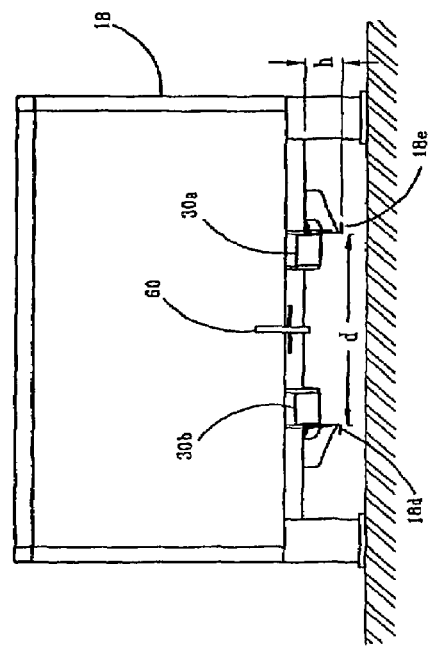
Fig. 10
Fig. 10A

REFUSE COLLECTION VEHICLE AND LIFTING APPARATUS THEREFOR

RELATED PATENT APPLICATION & INCORPORATION BY REFERENCE

This is a continuation patent application of International application PCT/US2007/003550, filed Dec. 8, 2007, which claimed the benefit under 35 USC 119(e) of U. S. Provisional Patent Application No. 60/771,778, entitled "REFUSE COLLECTION VEHICLE INCLUDING NOVEL LIFTING APPARATUS," filed Feb. 9, 2006. This related application is incorporated herein by reference and made a part of this application. If any conflict arises between the disclosure of the invention in this utility application and that in the related provisional application, the disclosure in this utility application shall govern. Moreover, the inventor incorporates herein by reference any and all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "cable" includes any flexible and elongated cord, string, rope or like device employing one or multiple strands of material.

The word "rectangular " includes square.

BACKGROUND

One type of refuse collection vehicle uses a lifting apparatus, commonly referred to as a "roll off," to lift a refuse storage container off the ground onto a flat bed of the vehicle and lowering a refuse storage container on the flat bed to the ground. Such conventional "roll off" lifting apparatus typically use a pair of hydraulic or pneumatic cylinders to move reciprocally a pulley apparatus as the refuse storage container is moved on and off the flat bed of the vehicle. It would be desirable to use only a single hydraulic or pneumatic cylinder, but proposed designs using only a single hydraulic or pneumatic cylinder create a lateral torque that twists the pulley apparatus, causing increased wear due to friction, or even jamming of the pulley apparatus.

SUMMARY

The claims that follow summarize my invention, which has one or more of the features depicted in the illustrative embodiments discussed in the section entitled "DETAILED DESCRIPTION OF SOME ILLUSTRATIVE EMBODIMENTS." Without limiting the scope of my invention as expressed by the claims that follow, in general terms, some, but not necessarily all, of its features are:

One, my refuse collection vehicle includes a vehicle body having a hoist. The lifting apparatus is mounted on the vehicle body and, upon operation, lifts a refuse storage container onto and off the body. The lifting apparatus is operably connected to the hoist so that upon elevating the hoist the lifting apparatus is moved from a substantially horizontal position to a tilted position where an inner end of the lifting apparatus is raised and an outer end of the lifting apparatus is lowered.

Two, the lifting apparatus has a frame and a pulley apparatus including a plurality of pulleys, a moveable pulley carrier, and a pulley cable connected to the pulleys. The pulley carrier may have opposed lateral sides engaging the frame as the pulley carrier moves. The frame may include a pair of parallel rails, and each rail may include a guide member. The opposed lateral sides of the pulley carrier ride along the guide members as the pulley carrier moves. The lateral sides and guide members may each be substantially V-shaped and configured and positioned to mate with each other. A replaceable wear member may be seated between each guide member and one lateral side of the pulley carrier.

Three, only a single fluid (hydraulic or pneumatic) actuated cylinder mechanism is used to move the pulley carrier. The cylinder mechanism has a rod operably connected to the pulley carrier that upon actuation moves the pulley carrier between an intermediate position along the frame and an extended position near the outer end of the lifting apparatus, and vice versa. The lifting apparatus may have a longitudinal centerline and the pulley carrier may be centered along this longitudinal centerline. The refuse storage container rides along the rails of the frame, and each rail may be equidistant from the longitudinal centerline. The rod may also be along the longitudinal centerline. Friction is minimized and jamming is minimized or avoided by connecting the pulley cable in a manner to the pulleys to apply substantially equal forces to the moveable pulley carrier so the pulley carrier avoids lateral twisting as it moves along the frame. In other words, when actuated, the cylinder moves the pulley carrier without applying thereto a lateral twisting force or torque.

Four, the pulley apparatus may include a first and second pulley carrier. The first pulley carrier may be fixedly mounted to the frame near the inner end of the lifting apparatus, and the second or moveable pulley carrier may be attached to an outer end of the cylinder rod and positioned between the rails and moveable along the rails as the rod moves. The first pulley carrier may have a housing in which is mounted a first pulley disposed in a substantially horizontal orientation when the lifting apparatus is in the substantially horizontal position. This first pulley may have an axle along the longitudinal centerline that may be substantially vertically oriented when the lifting apparatus is in the substantially horizontal position. A second pulley may be mounted on an exterior of the first pulley carrier housing in an orientation at or near vertical when the lifting apparatus is in the substantially horizontal position. This second pulley may have an axle lying in a plane that may be substantially at a right angle with respect to the longitudinal centerline. The second pulley carrier may have a housing in which may be mounted third and fourth pulleys axially aligned along the longitudinal centerline and substantially equidistant from each rail. The third pulley may be on top of the fourth pulley and the third and fourth pulleys may be in a substantially horizontal orientation when the lifting apparatus is in the substantially horizontal position. The pulley cable may have one end fixedly attached at or near the inner end of the lifting apparatus that extends from the inner end first around the third pulley, then around the first pulley, next around the fourth pulley, and finally around the second pulley to terminate in a free end that is adapted to be detachably connected to the refuse storage container. The axle of the second pulley may be tilted so the pulley cable avoids engaging the cylinder mechanism.

These features are not listed in any rank order nor is this list intended to be exhaustive.

DESCRIPTION OF THE DRAWING

Some embodiments of my refuse collection vehicle, illustrating all its features, will now be discussed in detail. These embodiments depict my novel and non-obvious refuse collection vehicle as shown in the accompanying drawing, which is for illustrative purposes only. This drawing includes the following figures (FIGS.), with like numerals indicating like parts:

FIG. A1 is a side view of my refuse collection vehicle prior to loading thereon a refuse storage container using the lifting apparatus shown in FIG. 2.

FIG. B1 is a side view of the refuse collection vehicle shown in FIG. 1A with the lifting apparatus attached to the flat bed body of the vehicle and prior to lifting a refuse storage container onto the vehicle's flat bed body.

Figure 2:
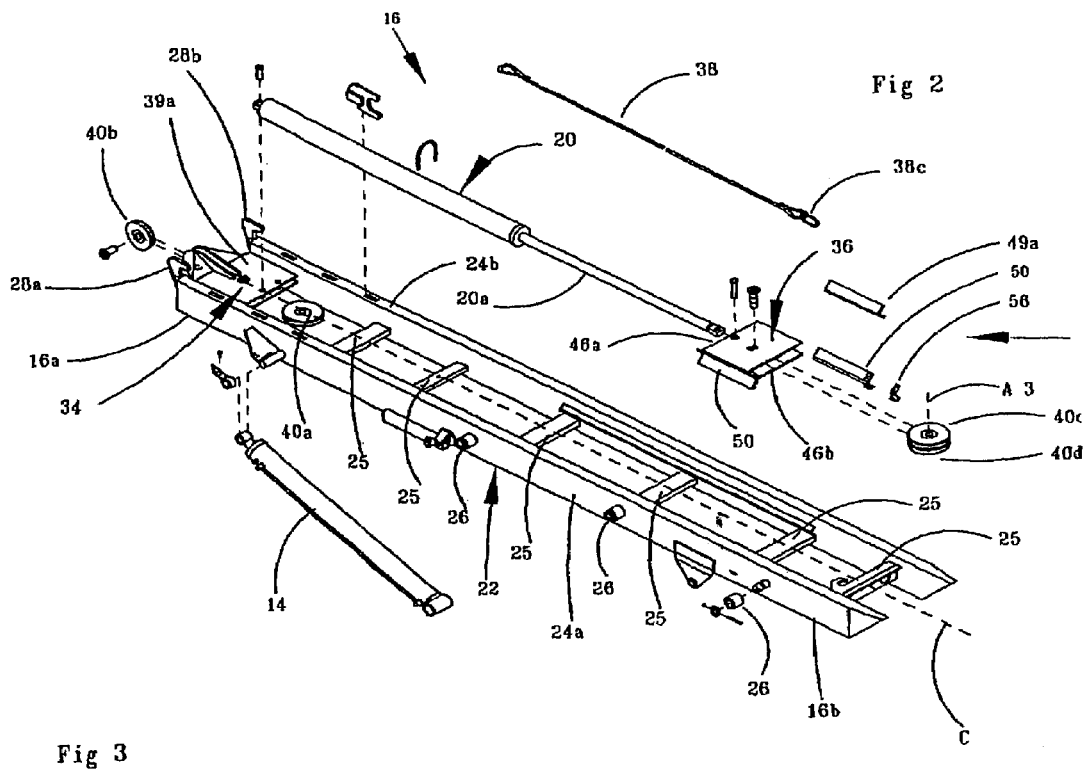

FIG. 2 is an exploded perspective view of my lifting apparatus.

Figure 3:
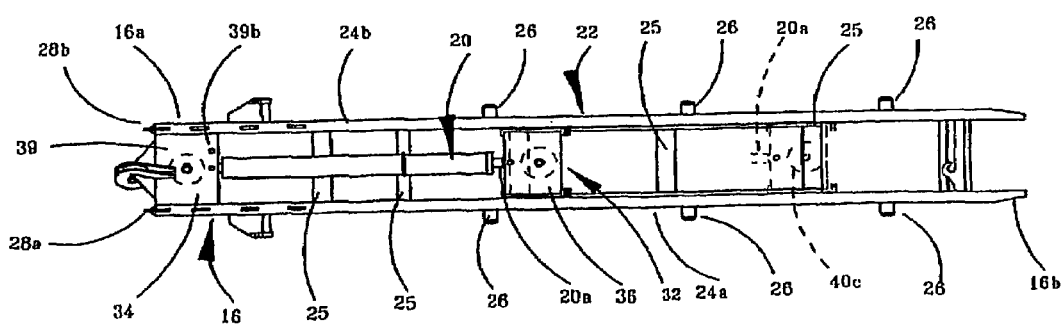

FIG. 3 is a plan view of the underside of my lifting apparatus shown in FIG. 2 and assembled.

Figures 4, 5:
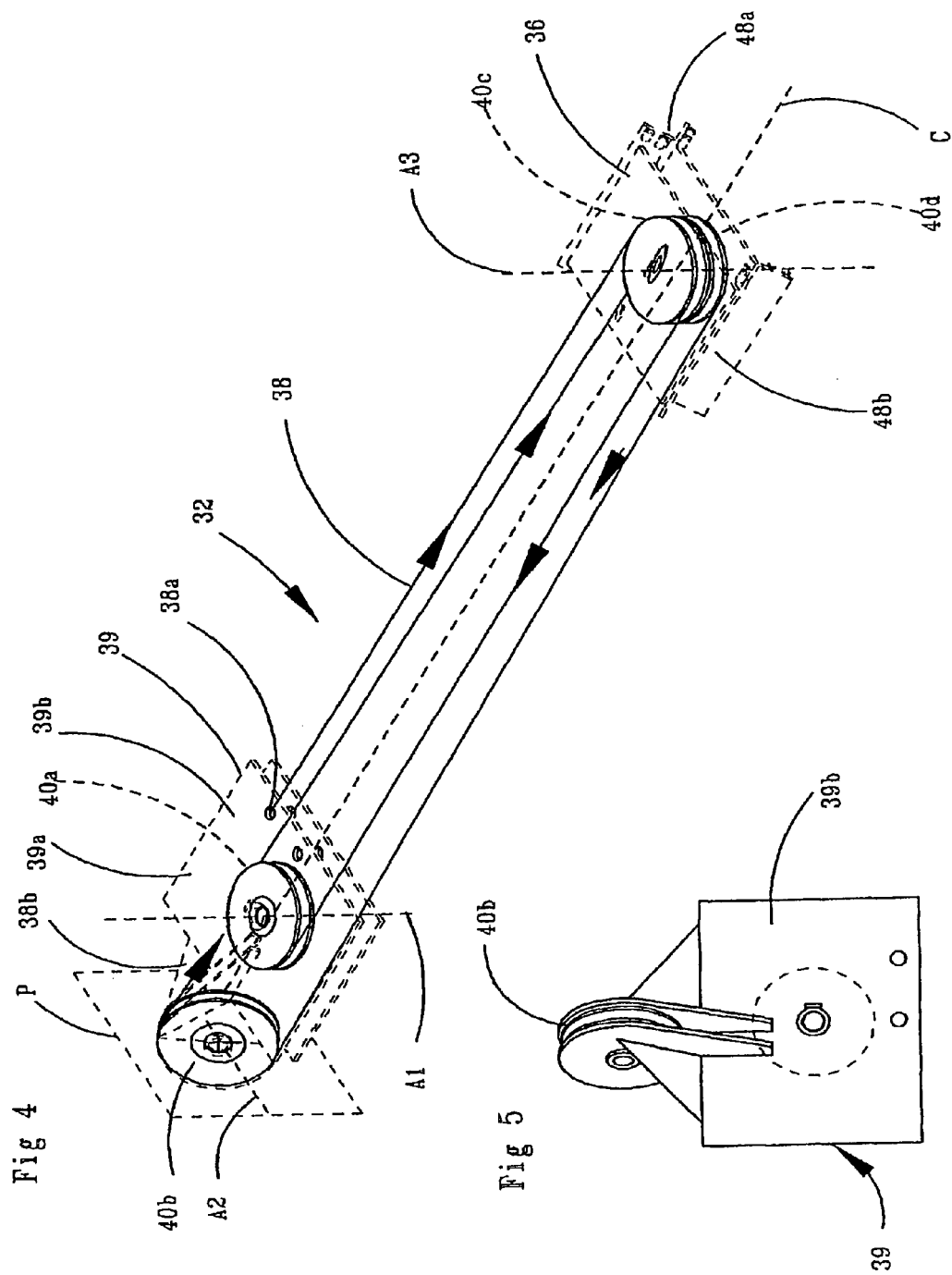

FIG. 4 is a schematic diagram depicting the manner in which a cable is wound about a pulley apparatus used in the lifting apparatus.

FIG. 5 is a plan view showing a mounting component of the pulley apparatus that is attached to an inner end of my apparatus.

FIG. 5A is a plan view showing an alternate mounting component of the pulley apparatus that is attached to an inner end of my apparatus.

FIG. 6 is a schematic diagram illustrating the forces acting on the moveable pulley carrier component used in my lifting apparatus.

FIG. 7 is a plan view of a pulley carrier component of the pulley apparatus that is mounted to move reciprocally along the lifting apparatus.

FIG. 8 is an end view taken along line 8-8 of FIG. 7.

FIG. 9 is a view taken along line 9-9 of FIG. 7.

FIG. 9A is a plan view of an end cover plate that holds a replaceable wear member in position in the pulley carrier component until replaced.

FIG. 10 is a side view illustrating the lifting apparatus elevated by the vehicle's hoist and positioned next to a refuse storage container on the ground.

FIG. 10A is a sectional view taken along line 10A-10A of FIG. 10.

Figures 11, 11A:
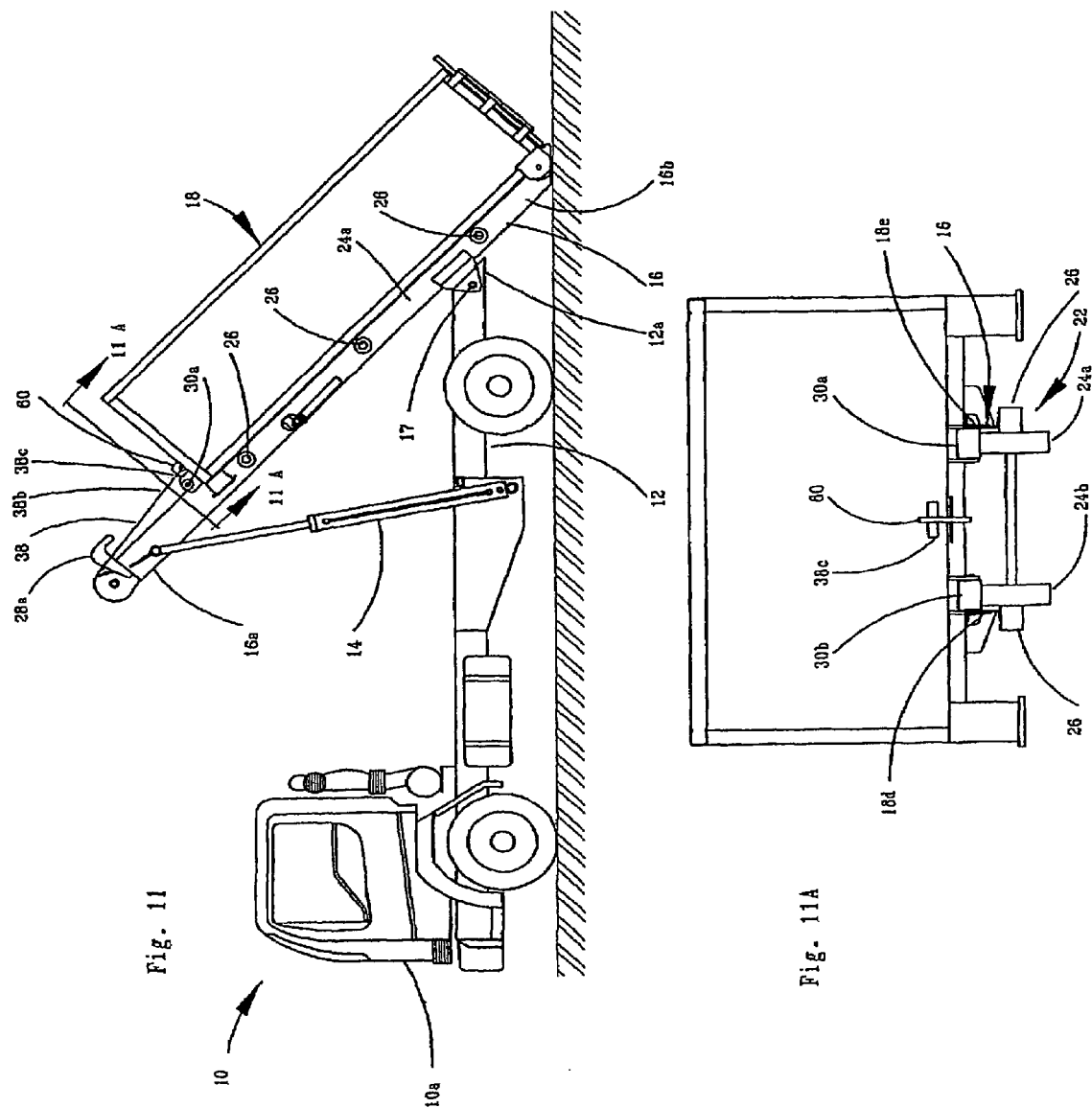

FIG. 11 is a side view illustrating a refuse storage container being lifted off the ground onto the flat bed body of the vehicle.

FIG. 11A is a cross-sectional view taken along line 11A-11A of FIG. 11.

FIG. 12 is a side view showing the lifting apparatus completely lowered into a horizontal orientation and the refuse storage container supported entirely by the flat bed body of the vehicle.

DETAILED DESCRIPTION OF SOME EMBODIMENTS

One embodiment of my refuse collection vehicle is illustrated in FIGS. 1A, 1B, and FIGS. 10 through 12 and generally designated by the numeral 10. This refuse collection vehicle 10 comprises a flat bed vehicle body 12 including a pair of hoists 14 (only one shown) on each side of the body and a lifting apparatus 16 (FIGS. 2 and 3) supported on the flat bed vehicle body. The lifting apparatus 16 is designed to lift a standard refuse storage container 18 off the ground and place the container on the flat bed vehicle body 12 and to lower the refuse storage container on the body to the ground after being dumped. Each side of the lifting apparatus 16 is operably connected to one hoist 14, and a pivot element 17 on each side of the vehicle body 12 is attached to the lifting apparatus 16 near its outer end 16b. Upon elevating the pair of hoists 14, the lifting apparatus 16 pivots at the pivot element 17 and is moved from a substantially horizontal position (FIG. 1B) to a tilted position (FIG. 10) where an inner end 16a of the lifting apparatus 16 is raised and the outer end 16b of the lifting apparatus is lowered. When in the tilted position, a single fluid actuated cylinder mechanism, a hydraulic or pneumatic cylinder 20 (FIGS. 2 an 3), has its rod 20a driven to lift the refuse storage container 18 onto the flat bed body 12 or lower it to the ground.

The lifting apparatus 16 is an elongated ladder-like structure having a longitudinal centerline C (FIG. 2). The lifting apparatus 16 is centrally position along the flat bed body 12 initially in a substantially horizontal orientation with its inner end 16a nearby a cab 10a of the vehicle 10 and its outer end 16b projecting beyond an outer end 12a of the flat bed body 12. It includes a frame 22 including a pair of substantially parallel rails 24a and 24b connected by a series of cross bars 25, each rail being equidistant from the longitudinal centerline C. On each exterior side of each rail 24a and 24b are a series of spaced apart rollers 26 that support the refuse storage container 18 when it is on the flat bed body 12. As best illustrated in FIG. 12, at the inner end 16a of the lifting apparatus 16 are a pair of hook elements 28a and 28b, each hook element respectively engaging a pin 30a and 30b (FIG. 11A) projecting from opposed sides of the refuse storage container 18 that has been lifted onto the flat bed body 12.

As best depicted in FIGS. 2, 3 and 4, the drive cylinder 20 is operably connected to a pulley system 32 including a stationary pulley carrier 34 fixedly mounted to the frame 22 near the inner end 16a of the lifting apparatus 16, a pulley carrier 36 mounted to move reciprocally along the frame 22, and a pulley cable 38 connecting these pulley carriers. The stationary pulley carrier 34 has a housing 39 mounting two pulleys 40a and 40b. The housing 39 includes a top plate 39a (FIG. 2) and a bottom plate 39b (FIGS. 3 and 5). The pulley 40a is disposed in a substantially horizontal orientation within the housing 39 between the top plate 39a and the bottom plate 39b when the lifting apparatus 16 is in the substantially horizontal position. This pulley 40a has its axle A1 (FIG. 4) along the longitudinal centerline C oriented substantially vertically when the lifting apparatus 16 is in the substantially horizontal position. The other pulley 40b is mounted on the exterior of the top plate 39a. The pulley 40b has an axle A2 (FIG. 4) lying in a plane P (FIG. 4) that is substantially at a right angle with respect to the longitudinal centerline C. As best shown in FIGS. 5 and 6, the body of the pulley 40b may be in an orientation at or near vertical when the lifting apparatus 16 is in the substantially horizontal position. As illustrated in FIG. 5, the pulley 40b may be tilted or angled slightly with respect to the bottom plate 39b. Depending on the size of the pulleys, this may be preferred so the cable 38 does not engage the cylinder 20 when it winds around the other pulleys 40a, 40c, and 40d. In other situations, as illustrated in FIG. 5A, the pulley 40b may be in an orientation at vertical when the lifting apparatus 16 is in the substantially horizontal position.

The moveable pulley carrier 36 is attached to an outer end of the rod 20a of the cylinder 20 and positioned between the rails 24a and 24b and mounted to slide along these rails as the cylinder rod is pneumatically or hydraulically driven. As shown in FIG. 3 in solid lines, when the rod 20a is withdrawn into the cylinder 20, the pulley carrier 36 is approximately midway between the ends 16a and 16b of the lifting apparatus 16. When the rod 20a is extended, the pulley carrier 36 is moved to the outer end 16b of the lifting apparatus 16. The pulley carrier 36 is centered along the longitudinal centerline, and the rod 20a is substantially disposed lengthwise along the longitudinal centerline C and substantially equidistant from each rail 24a and 24b. As discussed subsequently in greater detail, the rod 20a moves in a path substantially parallel to the rails 24a and 24b as it is extended to pull the refuse storage container 18 onto the flat bed body 12 or withdrawn to roll the container off the flat bed body.

As illustrated in FIGS. 7 through 9, the pulley carrier 36 houses a pair of pulleys 40c and 40d axially aligned. The axles A3 and A4 (FIG. 9) of these pulleys 40c and 40d are disposed along the longitudinal centerline C and are substantially equidistant from each rail 24a and 24b. The pulley 40c is on top of the pulley 40d and both these pulleys are in a substantially horizontal orientation when the lifting apparatus 16 is in the substantially horizontal position with their axles A3 and A4 vertically oriented. The pulley carrier 36 includes a top plate 46a and a bottom plate 46b connected together by opposed substantially V-shaped plates 48a and 48b forming opposed lateral sides of the pulley carrier 36.

Replaceable wear members, such as for example, flat and rectangular plastic strips 50 (only one shown in FIG. 2) are used to minimize the friction between the individual V-shaped plates 48a and 48b and a mating V-shaped guide member 49a and 49b (FIG. 9) attached to an inside surface of each rail 24a and 24b. The lateral sides the pulley carrier 36 ride along the guide members 49a and 49b as the pulley carrier 36 is moved reciprocally with the strips 50 bearing directly against the guide members 49a and 49b. As shown in FIGS. 7 through 9, brackets 52 attached to the exterior of the V-shaped plates 48a and 48b form upper and lower channels 54a and 54b, respectively, in each V-shaped plate 48a and 48b that enables a pair of plastic strips 50 to be manually inserted and removed therefrom without the means of screws, bolts, or similar fasteners passing through the strips in order to hold them in position. A suitable plastic, for instance, carbon reinforced composite sold under the trademark Nylatron GSM, which may be obtained from Port Plastics in City of Industry, Calif., may be used for an upper strip in the upper channel 54a and suitable plastic, for instance, an ultra high molecular weight nylon, may be used for a lower strip in the lower channel 54b.

Upon inserting an individual strip 50 into the upper channel 54a or lower channel 54b, as the case may be, bolts (not shown) detachably connect an end cap holder 56 to open ends of the channels 54a and 54b to retain the plastic strips in position within the channels. As shown in dotted lines in FIG. 9, the bolts pass through openings 56a in the end cap holder 56 into receptacles 58 at the ends of the V-shaped plates 48a and 48b, securing end cap holders to the plates. When the plastic strips 50 need to be replaced, the bolts are unfastened and the end cap holders 56 detached. The worn plastic strips 50 are slid from the channels 54a and 54b and replaced with new plastic strips and the end cap holders 56 reattached.

As illustrated in FIG. 4, the pulley cable 38 has one end 38a fixedly attached at or near the inner end 16a of the lifting apparatus 16 by tying or otherwise connecting it to the top plate 39a of the housing 39. The cable 38 extends from this inner end 16a in one direction first around the pulley 40c. Then reversing its direction the cable 18 extends around the pulley 40a. Next, again reversing direction, the cable 18 extends around the pulley 40d. And finally, the cable 18 extends around the pulley 40b and reverses direction for the last time to terminate in a free end 38b that is adapted to be detachably connected to the refuse storage container 18 as shown in FIG. 10. For example, the cable free end 38b may have a clip 38c (FIG. 2) that snaps onto a ring 60 centrally located on the side of the container 18 facing the lifting apparatus 16 as depicted in FIGS. 10 through 12.

In operation, the refuse collection vehicle 10 is first positioned with respect to the refuse storage container 18 on the ground with the lifting apparatus tilted as shown in FIG. 10 and the free end 38b of the cable 38 connected to the ring 60. The cylinder 20 is actuated to extend the rod 20a. As this is done the cable 18 winds about the pulleys 40a through 40d, quickly pulling the container 18 onto the lifting apparatus 16. As the rod 20a is extended, the container 18 is pulled onto the rollers 26 along the outer sides of the rails 24a and 24b. As illustrated in FIGS. 10A and 11A, spaced apart longitudinal L-shaped feet 18d and 18e along the bottom of the container 18 engage and ride on top of the rollers 26. The height h of the feet 18d and 18e is sufficient to clear the top surfaces of the rails 24a and 24b and the distance d that the feet 18d and 18e are spaced apart is just sufficient that these feet clear the outer sides of the rails. Therefore, only the rollers 26 support the container 18.

As the rod 20 advances, the pulley carrier 36 moves substantially along a straight path of travel from the midway position shown in solid lines in FIG. 3 to the extended position shown in dotted lines in FIG. 3. At the same time the container 18 is completely lifted onto the lifting apparatus 16, and the hook elements 28a and 28b engage the pins 30a and 30b to hold securely the container on the lifting apparatus. The hoists 14 are then actuated to lower the lifting apparatus 16 into the position shown in FIG. 12 with the container 18 on the lifting apparatus in a substantially horizontal orientation. When the vehicle 10 arrives at a dump to unload refuse from the container 18, the hoists 14 are again actuated to raise the lifting apparatus 16 into a tilted position and a back door (not shown) of the container is opened to allow refuse to fall from the container due to gravity. The vehicle 10 may return the container 18 to its original location and off-load it onto the ground by first tilting the lifting apparatus 16 using the hoists 14 and then actuating cylinder 20 so the rod 20a is moved from the extended position to the withdrawn position. As this is done the cable 18 unwinds from the pulleys 40a through 40d, gently lowering the container 18 onto the ground.

As schematically depicted in FIG. 6, the above-described manner of connecting the pulley cable 38 applies to the pulley carrier 36 substantially equal forces F1 and F2 acting on the pulleys 40c and 40d so the pulley carrier avoids twisting laterally as it moves reciprocally along the frame. This avoids undue wearing the replaceable plastic strips 50 carried in the V-shaped plates 48a and 48b forming the opposed lateral sides of the pulley carrier 36.

My refuse collection vehicle employing a "roll off" type lifting apparatus is faster, less costly, lighter, and simpler in operation than conventional "roll off" type lifting apparatus and minimizes wear due to friction and minimizes or avoids jamming.

SCOPE OF THE INVENTION

The above presents a description of the best mode contemplated of carrying out my invention, and of the manner and process of making and using it, in such full, clear, concise, and exact terms as to enable any person skilled in the art to which it pertains to make and use this invention. My invention is, however, susceptible to modifications and alternate constructions from that discussed above which are fully equivalent. Consequently, it is not the intention to limit my invention to the particular embodiments disclosed. On the contrary, my intention is to cover all modifications and alternate constructions coming within the spirit and scope of my invention as generally expressed by the following claims, which particularly point out and distinctly claim the subject matter of my invention:

The invention claimed is:

1. A refuse collection vehicle comprising
   a vehicle body including a hoist,
   a lifting apparatus on the vehicle body for lifting a refuse storage container onto and off the body, said lifting apparatus having a longitudinal centerline and being operably connected to the hoist so that upon elevating the hoist the lifting apparatus is moved from a substantially horizontal position to a tilted position where an inner end of the lifting apparatus is raised and an outer end of the lifting apparatus is lowered,
   said lifting apparatus having
   a frame including a pair of substantially parallel rails that supports a refuse storage container on the body, each rail being equidistant from the longitudinal centerline,
   a first pulley carrier fixedly mounted to the frame near the inner end of the lifting apparatus, said first pulley carrier having a housing in which is mounted a first pulley disposed in a substantially horizontal orientation when the lifting apparatus is in the substantially horizontal position, said first pulley having an axle along the longitudinal centerline that is substantially vertically oriented when the lifting apparatus is in the substantially horizontal position, and a second pulley mounted on an exterior of the first pulley carrier housing in an orientation at or near vertical when the lifting apparatus is in the substantially horizontal position, said second pulley having an axle lying in a plane that is substantially at a right angle with respect to the longitudinal centerline,
   a single fluid actuated cylinder mechanism fixedly mounted between the rails including a rod substantially disposed lengthwise along the longitudinal centerline and substantially equidistant from each rail, said rod adapted to move upon actuation of the cylinder mechanism in a path substantially parallel to the rails,
   a second pulley carrier attached to an outer end of the rod and positioned between the rails and moveable along the rails as the rod moves, said second pulley carrier having a housing in which are mounted third and fourth pulleys axially aligned along the longitudinal centerline and substantially equidistant from each rail, said third pulley being on top of the fourth pulley and said third and fourth pulleys being in a substantially horizontal orientation when the lifting apparatus is in the substantially horizontal position, and
   a pulley cable having one end fixedly attached at or near the inner end of the lifting apparatus that extends from said inner end first around the third pulley, then around the first pulley, next around the fourth pulley, and finally around the second pulley to terminate in a free end that is adapted to be detachably connected to the refuse storage container.

2. The refuse collection vehicle of claim 1 where the axle of the second pulley is tilted so the pulley cable avoids engaging the cylinder mechanism.

3. The refuse collection vehicle of claim 1 where the rails each include a guide member and the second pulley carrier has opposed lateral sides that ride along the guide members as the second pulley carrier is moved.

4. The refuse collection vehicle of claim 3 where the lateral sides and guide members are each substantially V-shaped and configured to mate with each other.

5. The refuse collection vehicle of claim 3 including a replaceable wear member seated between each guide member and one lateral side of the second pulley carrier.

6. The refuse collection vehicle of claim 1 wherein a pivot element on the vehicle body is attached to the lifting apparatus near the outer end of the lifting apparatus.

7. A refuse collection vehicle comprising
   a vehicle body including a hoist,
   a lifting apparatus on the vehicle body for lifting a refuse storage container onto and off the body, said lifting apparatus being operably connected to the hoist so that upon elevating the hoist the lifting apparatus is moved from a substantially horizontal position to a tilted position where an inner end of the lifting apparatus is raised and an outer end of the lifting apparatus is lowered,
   said lifting apparatus having
   a frame including a pair of substantially parallel rails that supports a refuse storage container on the body,
   a pulley carrier having opposed lateral sides that are positioned between and engage the rails, said pulley carrier being reciprocally moveable along the rails and carrying a pair of axially aligned pulleys, one pulley being on top of the other pulley and each said pulley being in a substantially horizontal orientation when the lifting apparatus is in the substantially horizontal position,
   a single fluid actuated cylinder mechanism having a rod disposed lengthwise between the rails, said rod being centrally connected to the pulley carrier and upon actuation of the cylinder mechanism moving the pulley carrier between an intermediate position along the frame and an extended position near the outer end of the lifting apparatus, and
   a pulley cable connected to the pair of pulleys in a predetermined manner to apply to the pulley carrier substantially equal forces so the pulley carrier avoids twisting laterally as it moves reciprocally along the frame.

8. The refuse collection vehicle of claim 7 where the rails each include a guide member and the lateral sides that ride along the guide members as the pulley carrier is moved reciprocally.

9. The refuse collection vehicle of claim 8 where the lateral sides and guide members are each substantially V-shaped to mate with each other.

10. The refuse collection vehicle of claim 8 including a replaceable wear member seated between each guide member and one lateral side of the pulley carrier.

11. A lifting apparatus adapted to be mounted on a flat bed body of a refuse collection vehicle comprising
    a frame including a pair of substantially parallel rails that are adapted to support a refuse storage container,
    a pulley carrier having opposed lateral sides that are positioned between and engage the rails, said pulley carrier being reciprocally moveable along the rails and carrying a pair of axially aligned pulleys, one pulley being on top of the other pulley and each said pulley being in a substantially horizontal orientation when the lifting apparatus is in the substantially horizontal position,
    a single fluid actuated cylinder mechanism having a rod disposed lengthwise between the rails, said rod being centrally connected to the pulley carrier and upon actuation of the cylinder mechanism moving the pulley carrier between an intermediate position along the frame and an extended position near the outer end of the lifting apparatus, and a pulley cable connected to the pair of pulleys in a predetermined manner to apply to the pulley carrier substantially equal forces so the pulley carrier avoids twisting laterally as it moves reciprocally along the frame.

12. The lifting apparatus of claim 11 where the rails each include a guide member and the lateral sides that ride along the guide members as the pulley carrier is moved reciprocally.

13. The lifting apparatus of claim 12 where the lateral sides and guide members are each substantially V-shaped and configured to mate with each other.

14. The refuse collection vehicle of claim 13 including a replaceable wear member seated between each guide member and one lateral side of the pulley carrier.

* * * * *